(12) United States Patent
DuFresne et al.

(10) Patent No.: US 10,327,554 B2
(45) Date of Patent: Jun. 25, 2019

(54) ADJUSTABLE HEAD SUPPORT

(71) Applicant: The Comfort Companies, LLC, Bozeman, MT (US)

(72) Inventors: Steven DuFresne, Hartland, WI (US); Anthony J. Minotte, New Berlin, WI (US)

(73) Assignee: THE COMFORT COMPANIES, LLC, Bozeman, MT (US)

( * ) Notice: Subject to any disclaimer, the term of this patent is extended or adjusted under 35 U.S.C. 154(b) by 0 days.

(21) Appl. No.: 15/429,975

(22) Filed: Feb. 10, 2017

(65) Prior Publication Data
US 2017/0224117 A1 Aug. 10, 2017

Related U.S. Application Data

(60) Provisional application No. 62/293,624, filed on Feb. 10, 2016.

(51) Int. Cl.
| | |
|---|---|
| *A47C 7/36* | (2006.01) |
| *A47C 7/38* | (2006.01) |
| *A61G 5/12* | (2006.01) |
| *A61G 15/12* | (2006.01) |
| *B60N 2/806* | (2018.01) |

(52) U.S. Cl.
CPC ............... *A47C 7/38* (2013.01); *A61G 5/121* (2016.11); *A61G 15/125* (2013.01); *B60N 2/806* (2018.02)

(58) Field of Classification Search
CPC ........ B60N 2/865; B60N 2/888; B60N 2/806; B60N 2/80

USPC ................ 297/61, 220, 283.4, 391
See application file for complete search history.

(56) References Cited

U.S. PATENT DOCUMENTS

| | | | |
|---|---|---|---|
| 2,560,925 A | 7/1951 | Brown | |
| 2,613,725 A | 10/1952 | Woodhall | |
| 2,652,221 A * | 9/1953 | Kampa | B60R 1/078 248/276.1 |
| 2,740,467 A | 4/1956 | Page | |
| 3,497,259 A | 2/1970 | Sherfey | |
| 3,643,996 A | 2/1972 | Carnahan | |
| 3,730,589 A | 5/1973 | Lane | |
| 3,877,751 A | 4/1975 | Rasmussen | |
| 3,885,831 A | 5/1975 | Rasmussen | |
| 3,964,788 A | 6/1976 | Kmetyko | |
| 4,466,662 A | 8/1984 | McDonald | |
| 4,641,883 A * | 2/1987 | Kato | A47G 9/1045 297/118 |
| 4,796,953 A | 1/1989 | Pereira | |
| 5,308,028 A | 5/1994 | Kornberg | |
| 5,332,287 A | 7/1994 | Whitmyer | |

(Continued)

FOREIGN PATENT DOCUMENTS

| | | |
|---|---|---|
| EP | 2389915 B1 | 10/2015 |
| WO | 2013133788 A1 | 9/2013 |

*Primary Examiner* — Shin H Kim
(74) *Attorney, Agent, or Firm* — Michael Best & Friedrich LLP

(57) ABSTRACT

An adjustable head support includes an articulating arm that has a plurality of members, at least one of the members is attached to a consecutive member and configured to rotate about a first axis. At least another of the members is attached to a consecutive member and configured to rotate about a second axis, the first axis and the second axis being perpendicular. A head support assembly is pivotally coupled to the articulating arm.

24 Claims, 10 Drawing Sheets

(56) References Cited

U.S. PATENT DOCUMENTS

| | | | |
|---|---|---|---|
| 5,378,043 | A | 1/1995 | Viano |
| 5,791,735 | A | 8/1998 | Helman |
| 5,967,613 | A | 10/1999 | McKeever |
| 6,199,947 | B1 | 3/2001 | Wiklund |
| 6,419,321 | B1 * | 7/2002 | Sack .................. A61G 5/12 297/405 |
| 6,761,338 | B2 | 4/2004 | Yamasaki |
| 6,755,472 | B2 | 6/2004 | Stenzel |
| 6,860,564 | B2 | 3/2005 | Reed |
| 6,962,392 | B2 | 11/2005 | O'Connor |
| 6,976,699 | B2 | 12/2005 | Koerlin |
| 7,640,090 | B2 * | 12/2009 | Uchida .................. B60N 2/002 701/49 |
| 7,832,803 | B2 | 11/2010 | Cassaday |
| 8,088,058 | B2 | 1/2012 | Juliana |
| 8,696,065 | B2 | 4/2014 | Udriste |
| 8,911,019 | B2 | 12/2014 | Josten |
| 8,979,196 | B2 | 3/2015 | Simpson |
| 9,061,616 | B2 | 6/2015 | Kondrad |
| 2003/0178880 | A1 | 9/2003 | Hannah |
| 2007/0085401 | A1 | 4/2007 | Hunziker |
| 2012/0261965 | A1 | 10/2012 | Elizalde |
| 2012/0292973 | A1 * | 11/2012 | Westerink ................ B60N 2/80 297/391 |
| 2013/0069411 | A1 * | 3/2013 | Walker .................... A47C 7/38 297/391 |
| 2013/0257014 | A1 | 10/2013 | Stephens |
| 2015/0068345 | A1 | 3/2015 | Josten |

* cited by examiner

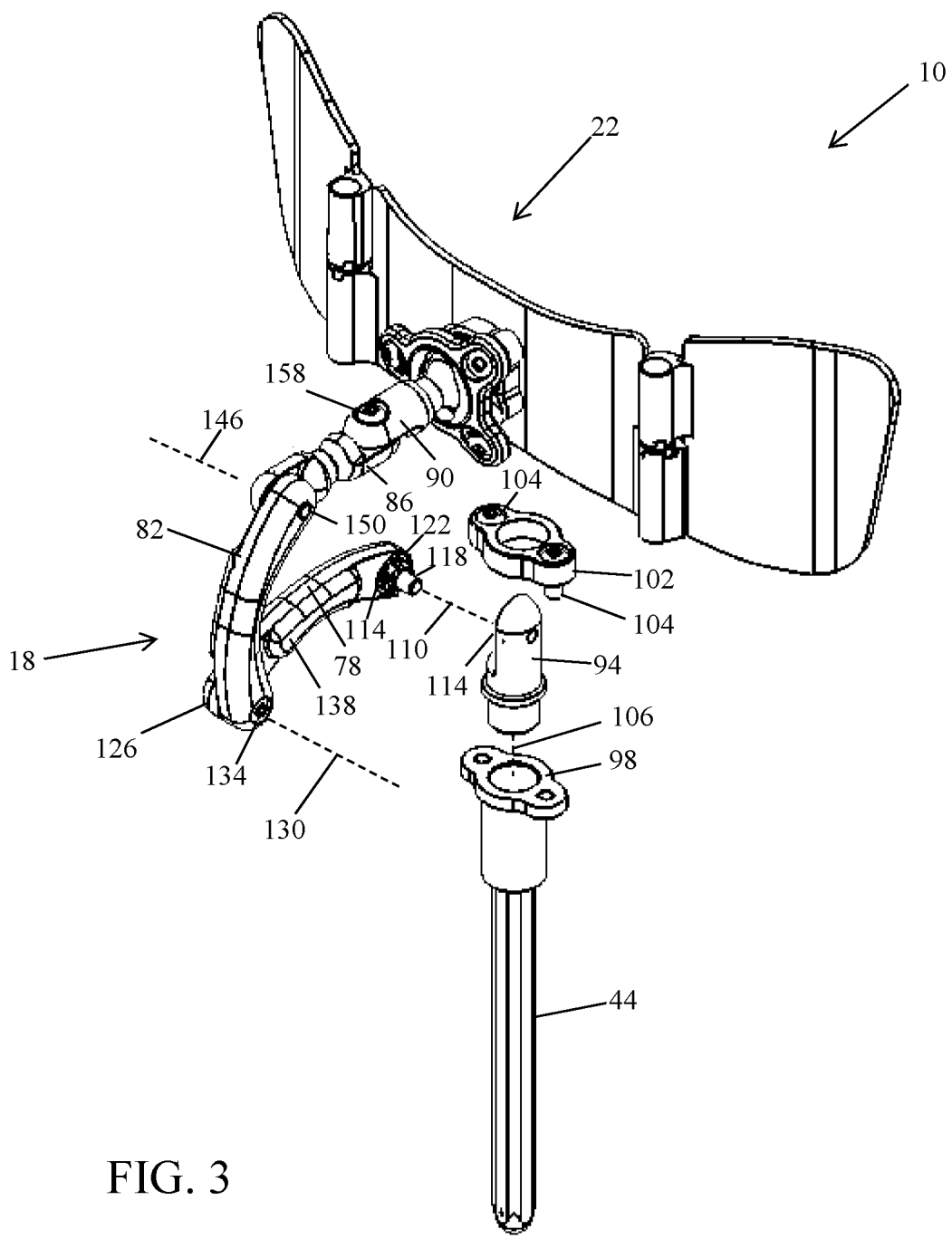
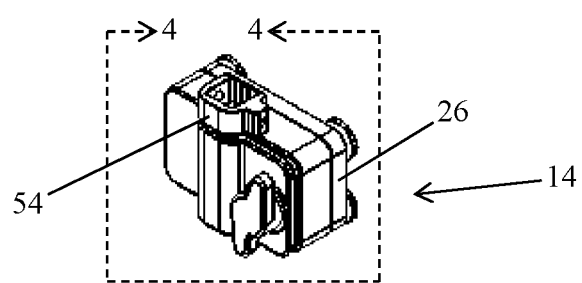
FIG. 3

ADJUSTABLE HEAD SUPPORT

CROSS-REFERENCE TO RELATED APPLICATIONS

This application claims priority to U.S. Provisional Patent Application No. 62/293,624, filed on Feb. 10, 2016 and entitled "Adjustable Head Support," the contents is hereby incorporated by reference in its entirety.

FIELD OF THE INVENTION

The present disclosure relates to adjustable head supports. More specifically, the present disclosure relates to a head support that is adjustable in three dimensions, and that can be used in conjunction with a chair.

SUMMARY OF THE INVENTION

The innovation provides, in one aspect, an adjustable head support that includes an articulating arm that has a plurality of members, at least one of the members is attached to a consecutive member and configured to rotate about a first axis. At least another of the members is attached to a consecutive member and configured to rotate about a second axis, the first axis and the second axis being perpendicular. A head support assembly is pivotally coupled to the articulating arm.

In another aspect, the innovation provides an adjustable head support that includes an articulating arm and a head support assembly that is pivotally coupled to the articulating arm. The articulating arm includes a swivel joint that is rotatably coupled to a height adjustment member, the swivel joint is configured to rotate about a first axis, and a plurality of consecutively coupled members. The plurality of consecutively coupled members include a first member that is rotatably coupled to the swivel joint and configured to rotate about a second axis perpendicular to the first axis, and a second member that is coupled at one end to a first adjacent member and configured to rotate about a third axis, and is coupled at the opposite end to a second adjacent member and configured to rotate about a fourth axis, the third axis being perpendicular to the fourth axis.

Other features and aspects of the invention will become apparent by consideration of the following detailed description and accompanying drawings.

BRIEF DESCRIPTION OF THE DRAWINGS

FIG. 3 is a partially exploded view of the adjustable head support of FIG. 1.

DETAILED DESCRIPTION

Figure 1:
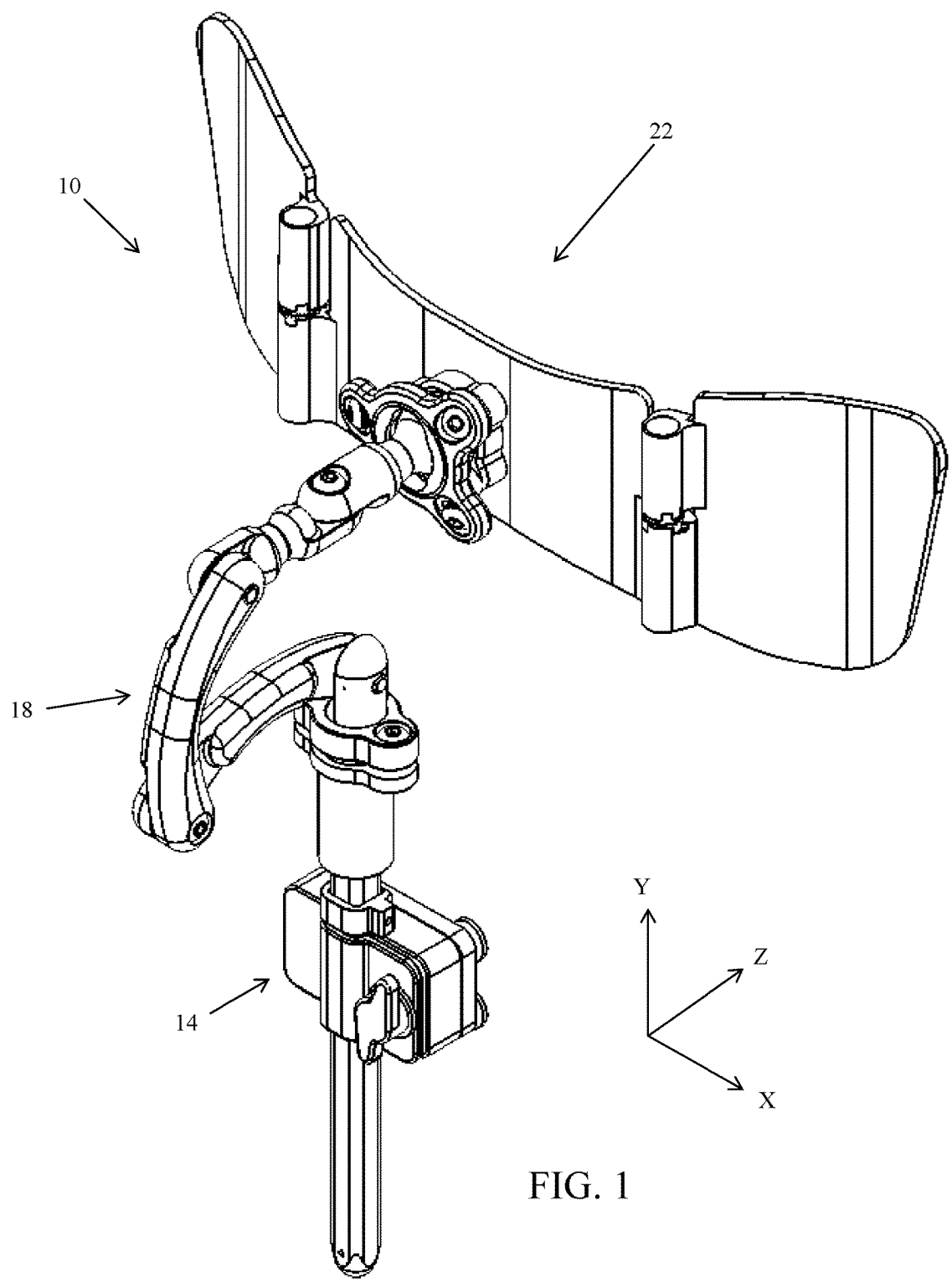
FIG. 1 is a perspective view of an embodiment of an adjustable head support for use with a chair.

Before embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways.

While the present disclosure illustrates an adjustable head support 10 that is configured for use with a chair, and more specifically a wheelchair, it should be appreciated that the adjustable head support 10 is not limited for use with a wheelchair. The adjustable head support 10 can be used with any suitable chair or support device suitable to support a person while sitting. Accordingly, as used herein, the term "chair" can include, but is not limited to, a wheelchair, an armchair, a rocking chair, a car seat, a swivel chair, an office chair, a recliner, a director's chair, a high chair, a sofa, and/or a backed stool. Accordingly, the adjustable head support 10 can be connected to (or mounted on) any such suitable chair, and then adjusted to provide head support for a person that is sitting in the chair.

Referring generally to FIGS. 1-9, an embodiment of the adjustable head support 10 is illustrated. The adjustable head support 10 is configured to be mounted to a suitable chair, such as a wheelchair (not shown). The adjustable head support 10 is also configured to be adjusted in three dimensions, about an X-axis, a Y-axis, and a Z-axis, to provide head support for a person sitting in the chair. The adjustable head support 10 includes a chair attachment assembly 14 that is moveably coupled to a first end of an articulating arm 18. A head support pad or head support assembly 22 is moveably coupled to a second end of the articulating arm 18. The articulating arm 18 moves with respect to the chair attachment assembly 14, while the head support pad 22 moves with respect to the articulating arm 18 to provide positioning of the head support pad 22 in three dimensions.

Figure 2:
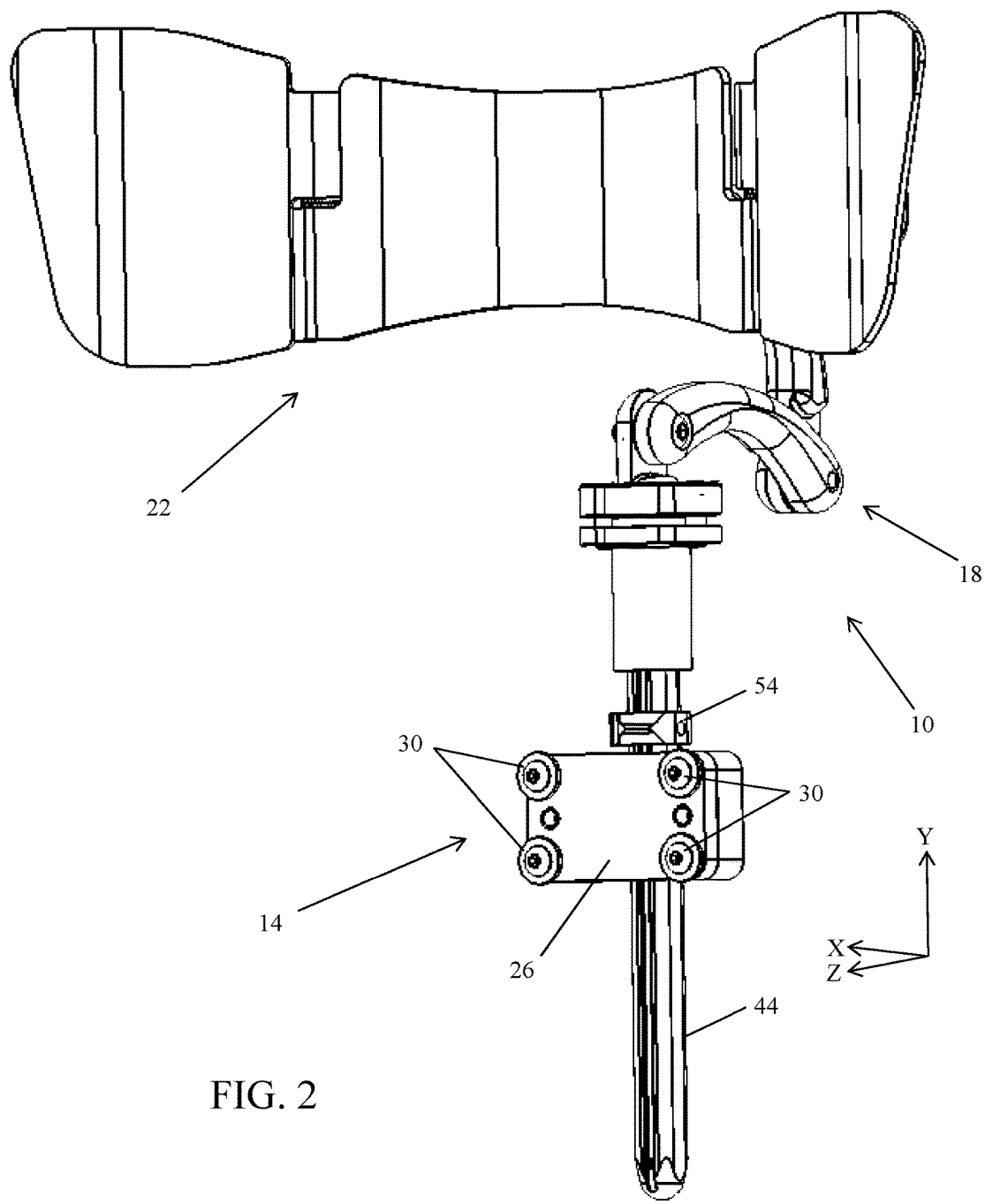
FIG. 2 is a perspective view of an opposite side of the adjustable head support of FIG. 1.
Figure 4:
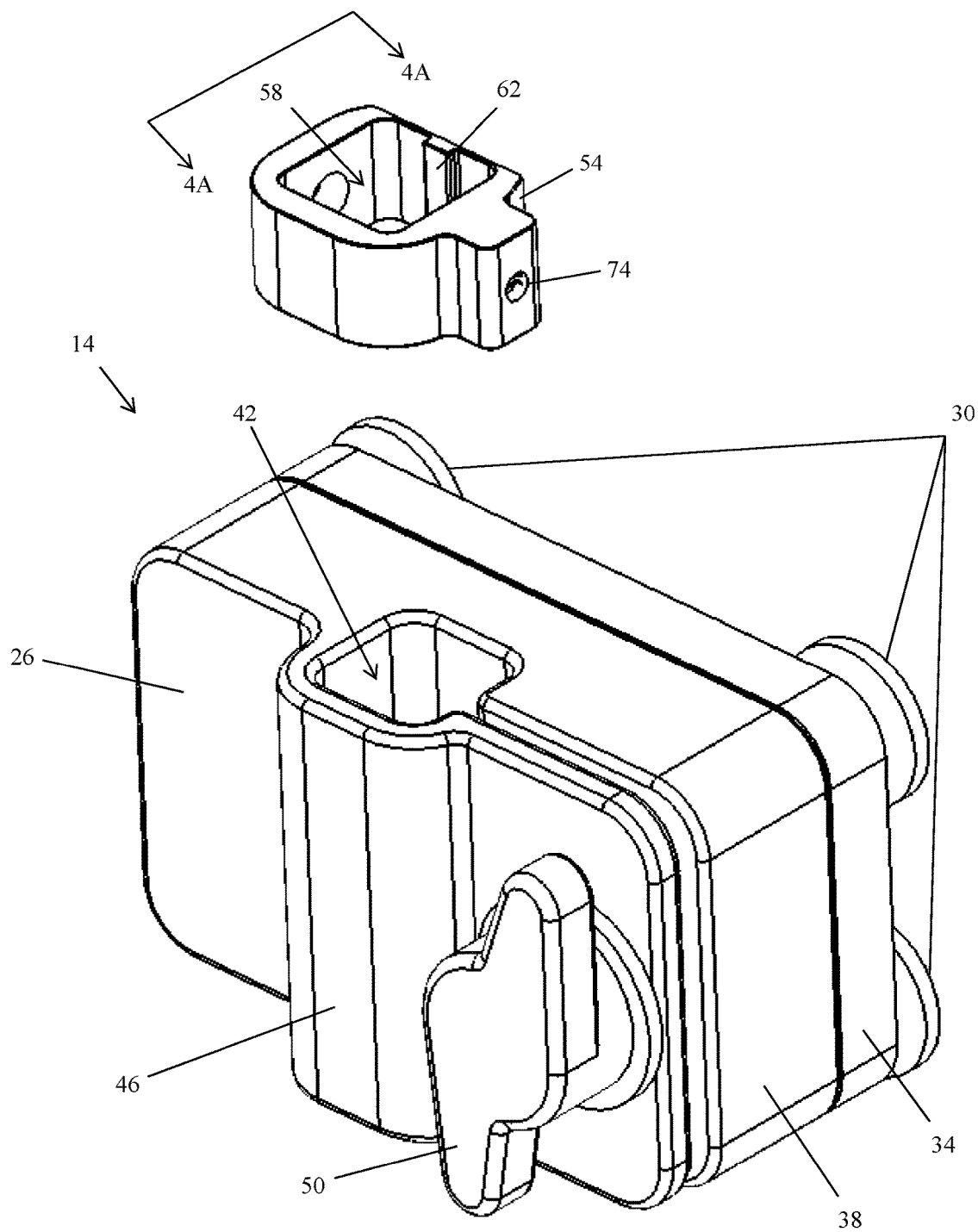
FIG. 4 is a perspective view of a chair attachment assembly and a height adjustment collar.

As illustrated in FIGS. 2-4, the chair attachment assembly 14 includes a chair attachment bracket 26 that is configured to be attached to a chair. To facilitate attachment to the chair, the bracket 26 includes a plurality of fasteners 30. More specifically, the fasteners 30 engage a first portion 34 of the bracket 26 (shown in FIG. 4). A portion of the chair (not shown) is positioned between the first portion 34 of the bracket 26 and a second portion 38 of the bracket 26 (shown in FIG. 4). Tightening the fasteners 30 draws the first and second portions 34, 38 together about the portion of the chair (e.g., on opposite sides of the portion of the chair) to form the connection. The chair can also include one or more apertures that each receives a corresponding fastener 30 to reinforce the connection between the bracket 26 and the chair. The fasteners 30 can form a removable connection between the bracket 26 and the chair, allowing for removal and/or adjustment of the adjustable head support 10 with respect to the chair. In the illustrated embodiment, the fasteners 30 are shown as bolts 30. However, in other embodiments the fasteners 30 can be any suitable fastening or connecting member, including, but not limited to a screw or any other suitable threaded member, or any other member suitable to connect the attachment bracket 26 to the chair. It should be appreciated that the first portion 34 can act as a spacer that is provided to avoid obstructions (e.g., caused by chair design, one or more chair components, etc.) when mounting the bracket 26 to the chair. Accordingly, in other examples of embodiments, and based on the existence and/or size of an obstruction, the bracket 26 can include a plurality of first portions 34 (e.g., in stacked relation) or no first portion 34.

Referring to FIG. 4, the attachment bracket 26 defines a slot or passage 42 that is configured to receive a portion of the articulating arm 18, and more specifically an elongated height adjustment member 44 (shown in FIGS. 3 and 5) in the illustrated embodiment. To assist with retaining the height adjustment member 44 in the slot 42, the attachment bracket 26 includes a compression arm 46 (or compression member) that extends the attachment bracket 26 and defines at least a portion of the slot 42. A tension adjustment member 50 couples a portion of the compression arm 46 to the attachment bracket 26. The tension adjustment member 50 is configured to increase or decrease the amount of compression between the compression arm 46 and the attachment bracket 26. In the illustrated embodiment, rotating the tension adjustment member 50 in a first direction draws the compression arm 46 towards the attachment bracket 26. This increases the compression or tension applied by the compression arm 46 to the height adjustment member 44 that is received by the slot 42, and assists with retaining the height adjustment member 44 in the slot 42. Rotating the tension adjustment member 50 in a second direction, opposite the first direction, releases the compression arm 46 away from the attachment bracket 26. This decreases the compression or tension applied by the compression arm 46 to the height adjustment member 44 that is received by the slot 42, allowing for the height adjustment member 44 to be moved within the slot 42. While the illustrated embodiments depicts the tension adjustment member 50 as a rotating screw member, in other embodiments any suitable structure that increases and/or releases compression or tension applied by the compression arm 46 can be used (e.g., a cam clamp, an adjustable cam lever, etc.).

In some embodiments, a height adjustment collar 54 is configured to limit unintentional downward movement of the height adjustment member 44 into the slot 42 of the chair attachment assembly 14. To facilitate limitation of this unintentional downward movement, the height adjustment collar 54 engages the height adjustment member 44, and the collar 54 is sized to be larger than the slot 42 (e.g., an outer diameter of the collar 54 is greater than an inner diameter of the slot 42). The height adjustment collar 54 defines a central aperture 58 that is configured to slidably receive the height adjustment member 44. The aperture 58 includes a projection 62 that extends from the collar 54 and into the aperture 58. The projection 62 is keyed to engage a channel 66 (see FIG. 6) extending along (e.g., at least partially defined by or secured to) the height adjustment member 44. The keyed arrangement between the projection 62 and the channel 66 (see FIG. 6) provides for proper positioning of the collar 54 in relation to the height adjustment member 44, and facilitates sliding engagement of the height adjustment collar 54 along the height adjustment member 44. In alternative embodiments, the locations of the projection 62 and channel 66 (if used) can be switched such that the collar 54 is provided with a channel along which a projection of the height adjustment member 44 is slidable.

Figure 6:
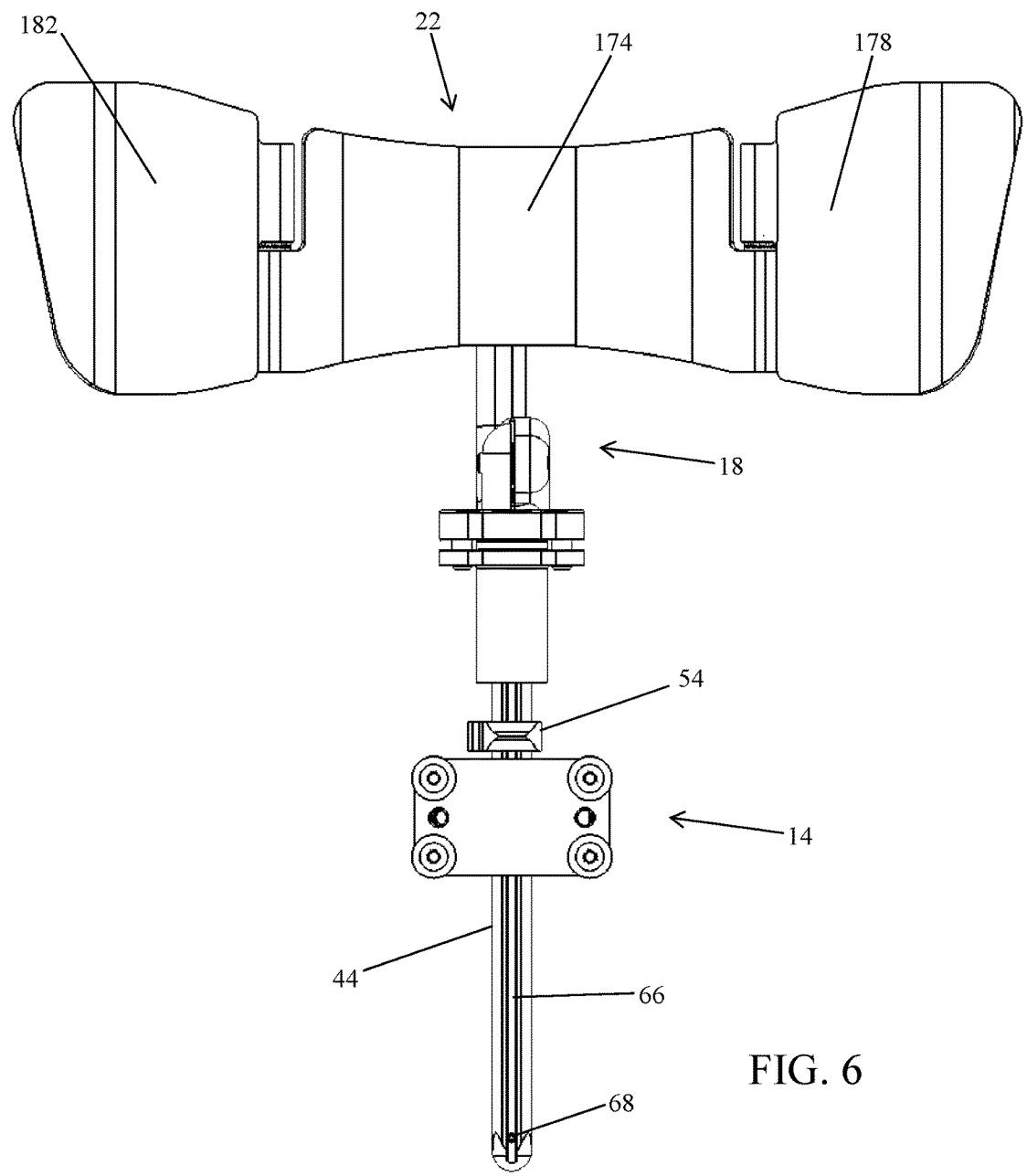
FIG. 6 is a front elevation view of the adjustable head support of FIG. 1.

As illustrated in FIG. 6, a set screw 68 projects from the channel 66 at an end of the height adjustment member 44 opposite the articulating arm 18. The set screw 68 limits unintentional separation of the adjustment collar 54 from the height adjustment member 44, reducing risk of loss of the adjustment collar 54. When deployed in the channel 66, the set screw 68 can also act as a barrier that limits the adjustment collar 54 from unintentionally sliding off the height adjustment member 44 (e.g., when the height adjustment member 44 is removed from the attachment bracket 26). To remove the adjustment collar 54, the set screw 68 can be withdrawn from the channel 66, thereby enabling the adjustment collar 54 to slide off the height adjustment member 44.

Figure 4A:
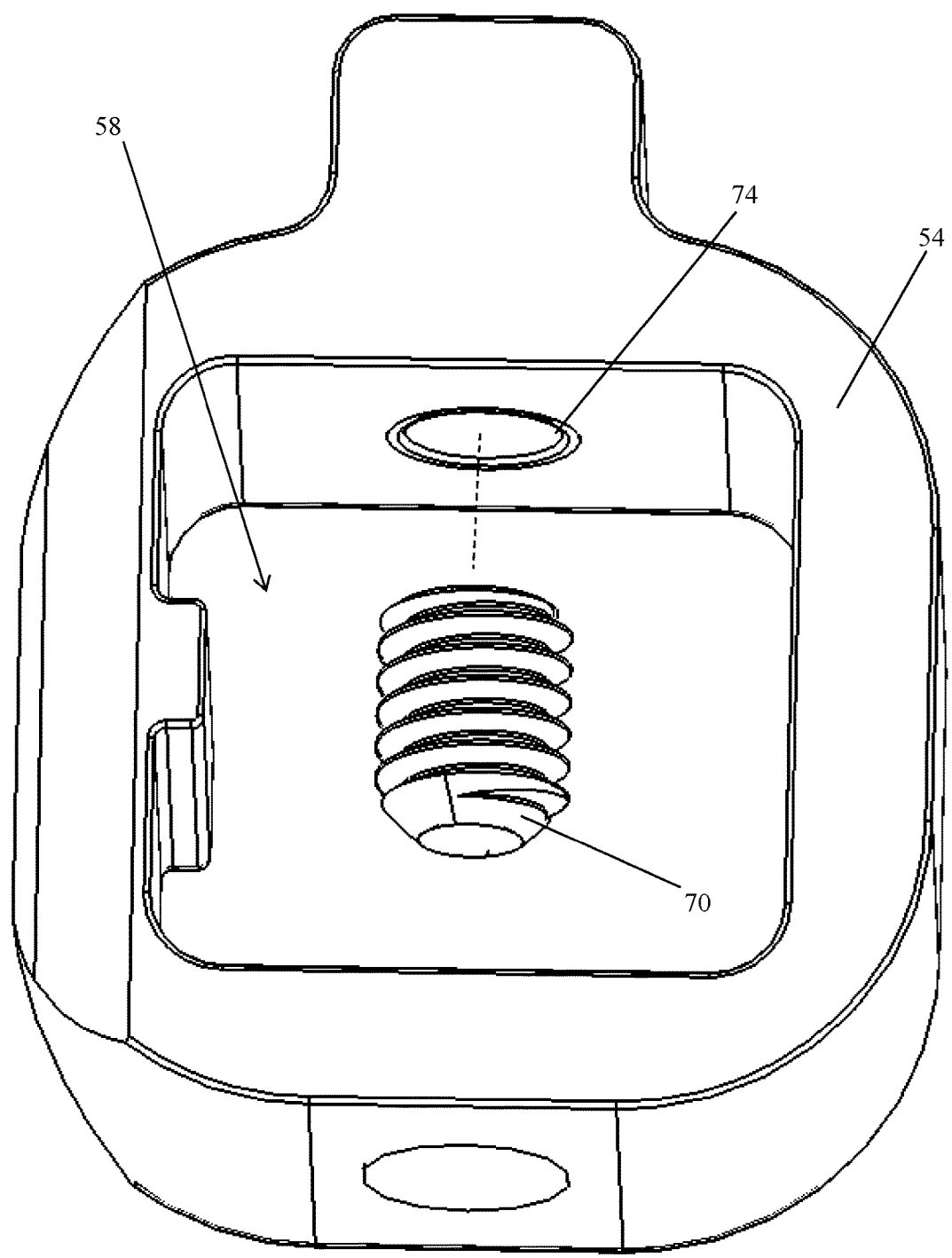
FIG. 4A is a perspective view of the height adjustment collar, taken along line 4A-4A of FIG. 4.

As illustrated in FIG. 4A, the height adjustment collar 54 of the illustrated embodiment includes a set screw 70 that is received by a set screw aperture 74 positioned through the collar 54. The set screw 70 assists with maintaining a selected position of the height adjustment collar 54 on the height adjustment member 44. Once the set screw 70 is received by the aperture 74 (and with the height adjustment member 44 received by the collar 54), the set screw 70 engages (or contacts) a surface of the height adjustment member 44. The additional force applied by the set screw 70 against the height adjustment member 44 assists with maintaining the position of the collar 54 in relation to the height adjustment member 44. To reduce the risk of losing the set screw 70 during positioning of the height adjustment collar 54, the set screw 70 is received by the set screw aperture 74 from the central aperture 58 side (shown in FIG. 4A). Thus, when disengaged from the height adjustment member 44, the set screw 70 is received within a passage (not shown) adjacent the set screw aperture 74. To adjust the set screw 70, a tool (e.g., a hex key, Allen key, Allen wrench, etc.) can be inserted into engagement with the set screw 70 through an exterior side of the set screw aperture 74, or the side of the set screw aperture 74 opposite the central aperture 58 side (shown in FIG. 4).

Figure 5:
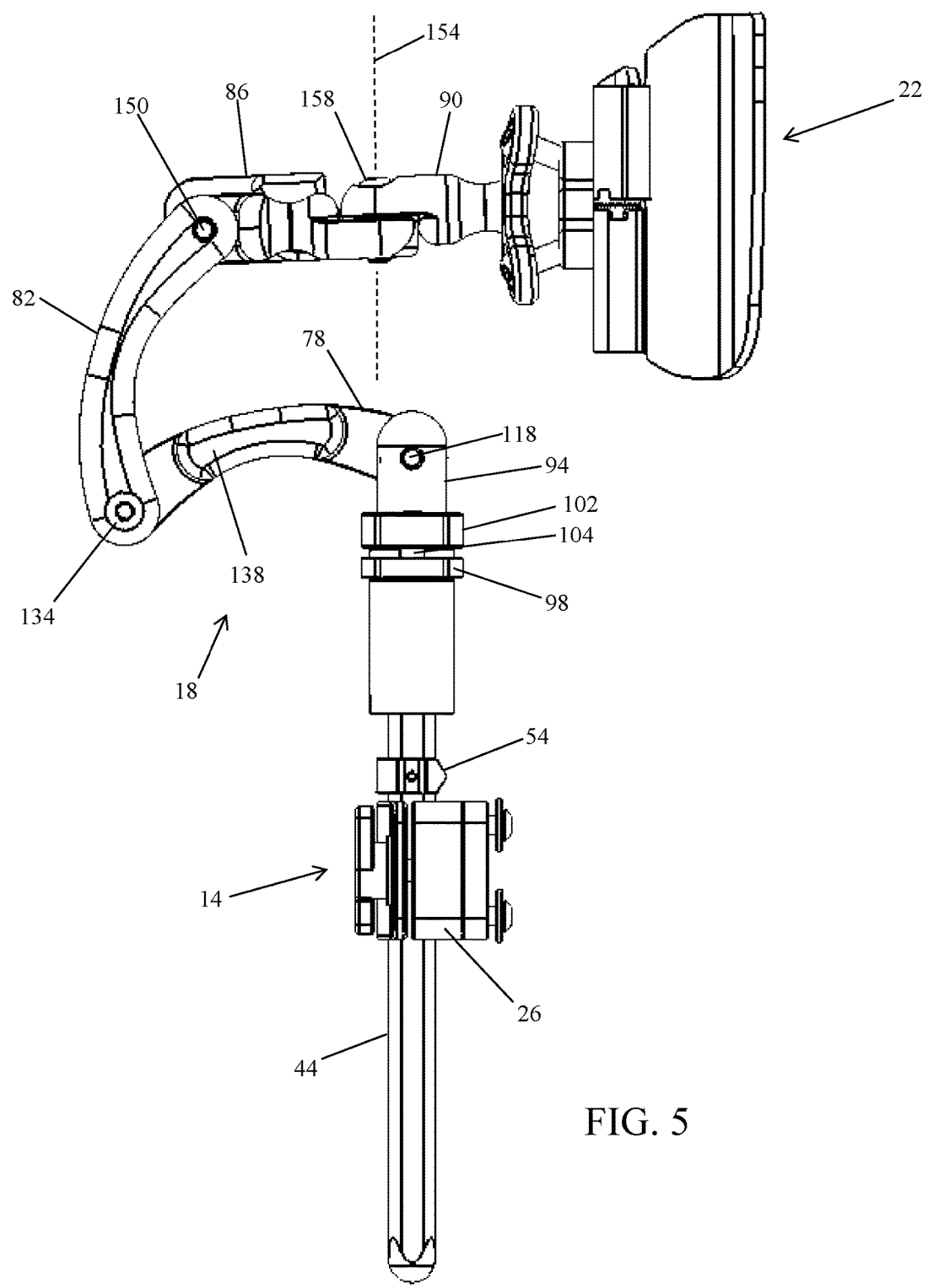
FIG. 5 is a first side view of the adjustable head support of FIG. 1.

As illustrated in FIGS. 3 and 5, the articulating arm 18 includes a plurality of interconnected articulating members 78, 82, 86, 90 that are connected to the elongated height adjustment member 44. In the illustrated embodiment, four members 78, 82, 86, 90 define an articulating portion of the articulating arm 18. However, in other embodiments, three or fewer, or five or more members may be used to define the articulating portion of the arm 18.

With continued reference to the illustrated embodiment, a first member 78 is coupled to the height adjustment member 44 at a swivel joint 94. The swivel joint 94 (or swivel 94) is received by a socket 98 that is connected to the height adjustment member 44. A flange 102 (or collar 102) selectively retains the swivel 94 in the socket 98. The flange 102 couples to the socket 98 by at least one fastener 104, and more specifically a plurality of fasteners 104. While the fasteners 104 are illustrated as bolts, in other embodiments the fastener 104 can be any suitable member than can selectively engage and disengage the flange 102 from the socket 98 (e.g., a threaded flange that engages corresponding threads on the socket 98, etc.). The flange 102 and the socket 98 retain the swivel 94 there between. The swivel 94 is configured to rotate about a first axis 106 (or axis of rotation 106), shown in FIG. 3. The axis 106 can be defined by the elongated height adjustment member 44. The swivel 94 is configured to rotate three hundred and sixty degrees (360°) about the axis 106. However, in other embodiments, the swivel 94 can rotate less than three hundred and sixty degrees (360°). To rotate the swivel 94, the fastener(s) 104 can be adjusted to loosen the connection between the flange 102 and the socket 98, freeing the swivel 94 to rotate. After rotation to the desired position (or orientation), the fastener(s) 104 can be adjusted to tighten the connection between the flange 102 and the socket 98 to maintain the swivel 94 in the desired position (or orientation). In other embodiments, the swivel 94 and the socket 98 can each include a plurality of teeth (or geared teeth) that are configured to interlock (or mesh) when positioned into a mating arrangement (e.g., a Hirth joint or coupling, etc.). The mating arrangement can be maintained by the flange 102. Additionally, in other embodiments the swivel 94 can be releasably secured in place with respect to the socket 78 (i.e., so that the swivel 94 can be releasably secured against rotation with respect to the socket) using other fasteners and structures, including without limitation locking collars, lockable bayonet fittings, and the like.

Not only does the swivel 94 rotate about the socket 98 (and height adjustment member 44) around the first axis 106, but the first member 78 is rotatably coupled to the swivel 94. More specifically, the first member 78 is configured to rotate about the swivel 94 around a second axis 110 (shown in FIG. 3) that can be positioned approximately perpendicular to the first axis 106. The first member 78 is configured to rotate less than three hundred and sixty degrees (360°) about the swivel 94 and around the second axis 110, and in some embodiments more specifically two hundred and forty degrees (240°) about the swivel 94 and around the second axis 110. To facilitate an adjustable connection between the first member 78 and the swivel 94, each includes a plurality of teeth 114 (or geared teeth) that are configured to interlock (or mesh) when positioned into a mating arrangement (e.g., a Hirth joint or coupling, etc.). The mating arrangement can be maintained by a fastener 118 (e.g., a bolt, etc.). The fastener 118 can be positioned along the second axis 110, and is configured to be loosened to disengage the teeth 114 that form the connection between the first member 78 and the swivel 94 to allow for rotation of the first member 78 with respect to the swivel 94 around the second axis 110, and tightened to engage the teeth 114 and form (or reform) a fixed connection between the first member 78 and the swivel 94 to maintain the position of the first member 78 in relation to the swivel 94.

In some embodiments, the first member 78 has a generally arcuate shape between a first end 122 (the end nearest the engagement with the swivel 94) and a second end 126 (that is opposite the first end 122). A second member 82 is connected to the first member 78 proximate the second end 126. Similar to the first member 78, the second member 82 can also have a generally arcuate shape. The first and second members 78, 82 are connected at and configured to rotate around a third axis 130 (shown in FIG. 3). The third axis 130 can be positioned generally parallel to the second axis 110. The first and second members 78, 82 also form an adjustable connection, with each member also including a plurality of teeth (or geared teeth) (not shown) that are configured to interlock (or mesh) when positioned into a mating arrangement (e.g., a Hirth joint or coupling, etc.). The geared teeth and the mating arrangement, which is the same as the connection between the first member 78 and the swivel 94, can be maintained by a fastener 134 (e.g., a bolt, etc.). The fastener 134 can be positioned along the third axis 130, and is configured to be loosened to disengage the teeth that form the connection between the first and second members 78, 82 to allow for rotation of the first member 78 and the second member 82 around the third axis 130, and tightened to engage the teeth and form (or reform) a fixed connection between the first and second members 78, 82 to maintain the position of the member 78, 82 in relation to one another.

Figure 7:
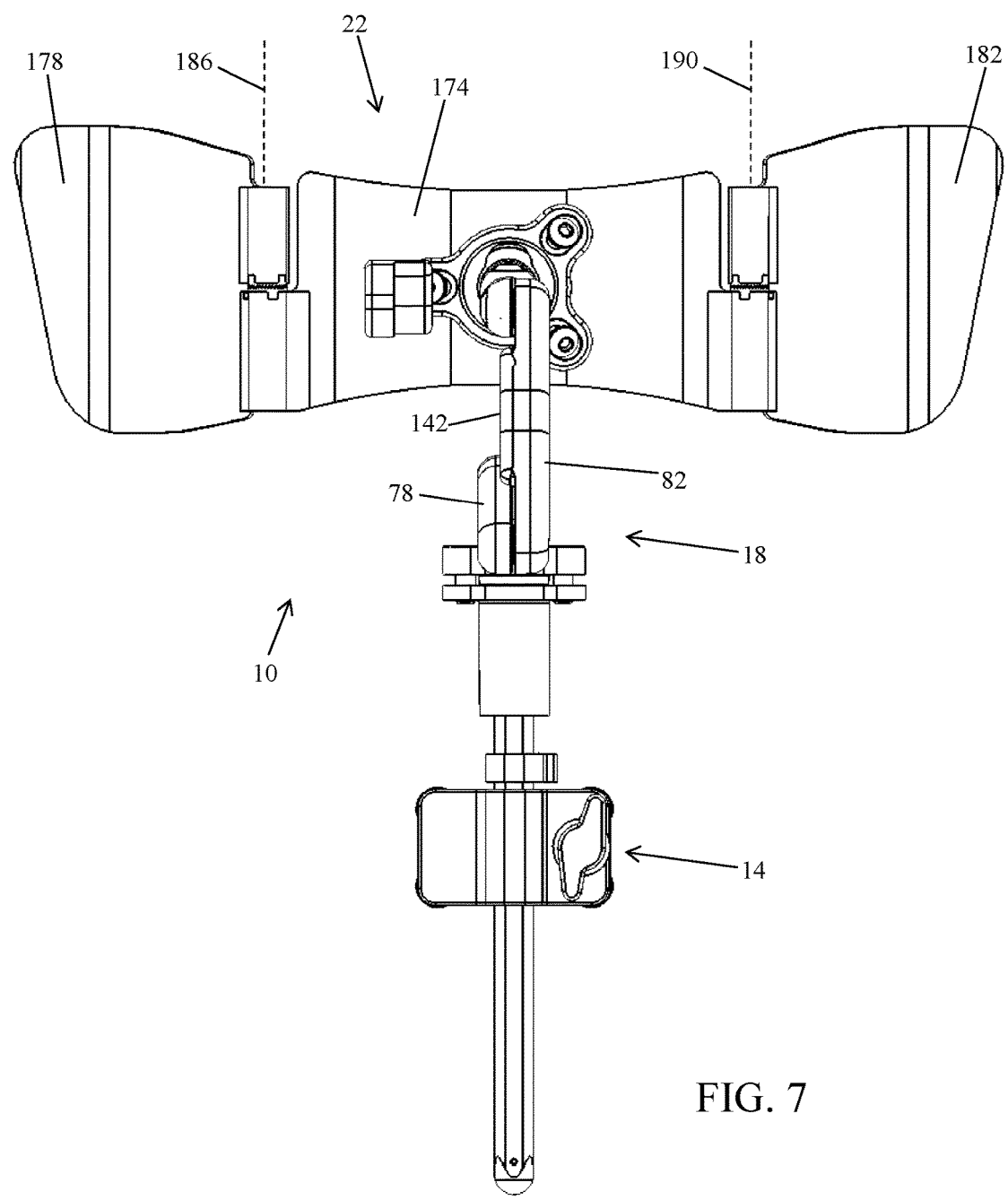
FIG. 7 is a rear elevation view of the adjustable head support of FIG. 1.
Figure 8:
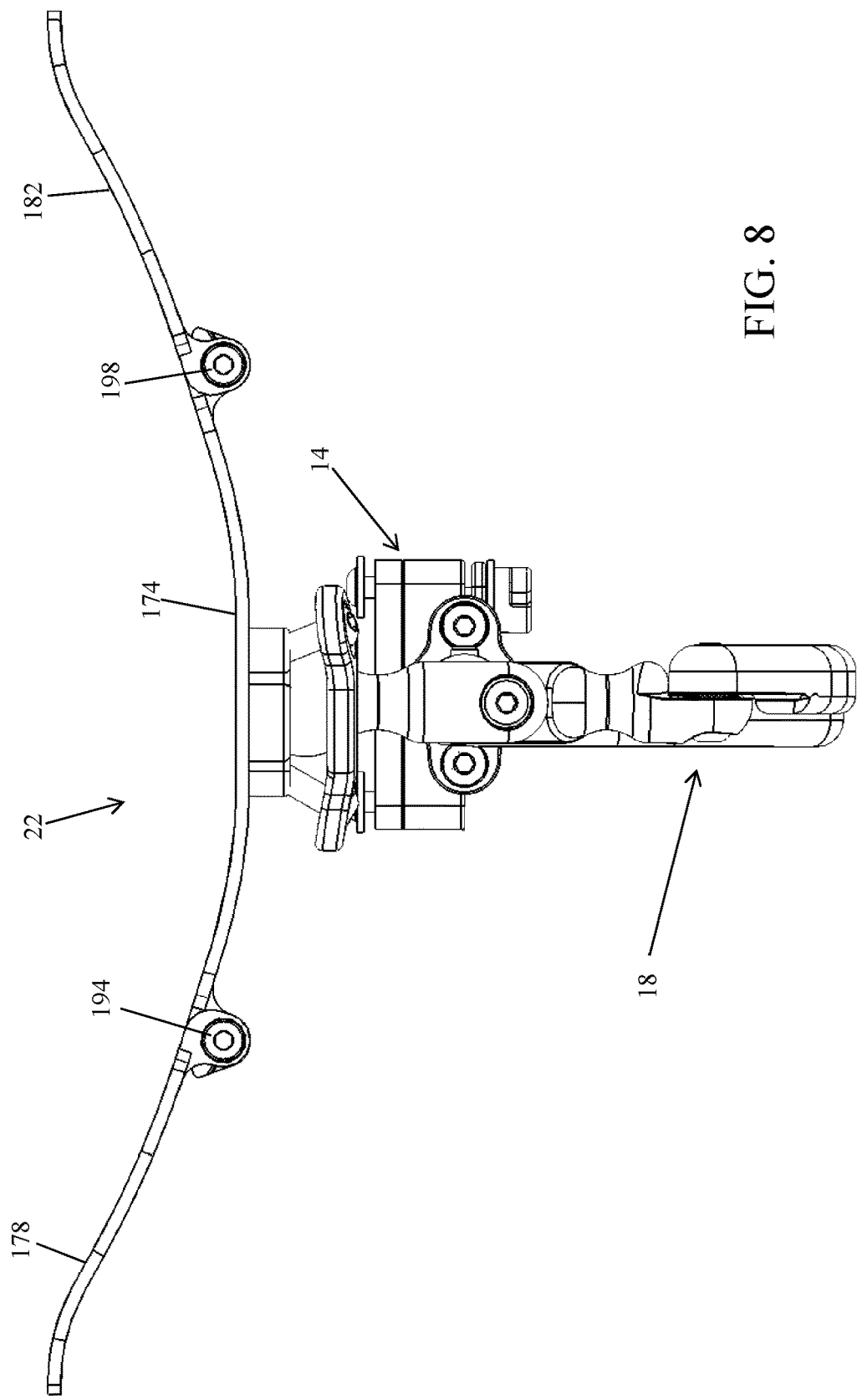
FIG. 8 is a top view of the adjustable head support of FIG. 1.

In the illustrated embodiment, and with particular reference to FIGS. 3, 5, and 7, the first member 78 includes a first projection 138 that extends along a portion of the member 78, whereas the second member 82 includes a second projection 142 that extends along a portion of the second member 82. The projections 138, 142 are positioned on opposing (or facing) sides of the first and second members 78, 82. The projections 138, 142 are provided to increase the strength and/or rigidity of the associated member 78, 82. In addition, the projections 138, 142 engage one another as the first and second members 78, 82 are rotated about the third axis 130, thereby limiting the distance the first member 78 rotates in relation to the second member 82 (and/or to limit the distance the second member 82 rotates in relation to the first member 78). To this end, the first member 78 rotates with respect to the second member 82 (or the second member 82 rotates with respect to the first member 78) around the third axis 130 less than three hundred and sixty degrees (360°), and in some embodiments more specifically approximately two hundred and eighty five degrees (285°). In other embodiments, one or both of the members 78, 82 do not include projections 138, 142, as the members 78, 82 can have sufficient strength (or rigidity). Removal of one or both members 78, 82 can increase the distance the members 78, 82 rotate about each other, up to and including three hundred and sixty degrees (360°) (e.g. the second member 82 can be shorter than the first member 78 to facilitate 360° of rotation).

A third member 86 is coupled to the second member 82 proximate an end of the second member 82 opposite the connection between the first and second members 78, 82. The second and third members 82, 86 are connected at and configured to rotate around a fourth axis 146 (shown in FIG. 3) that can be positioned generally parallel to the second and third axes 110, 130. The second and third members 82, 86 also form an adjustable connection, with each member also including a plurality of teeth (or geared teeth) (not shown) that are configured to interlock (or mesh) when positioned into a mating arrangement (e.g., a Hirth joint or coupling, etc.). The geared teeth and the mating arrangement, which is the same as the connection between the first member 78 and the swivel 94, can be maintained by a fastener 150 (e.g., a bolt, etc.). The fastener 150 can be positioned along the fourth axis 146, and is configured to be loosened to disengage the teeth that form the connection between the second and third members 82, 86 to allow for rotation of the second member 82 and the third member 86 around the fourth axis 146, and tightened to engage the teeth and form (or reform) a fixed connection between the second and third members 82, 86 to maintain the position of the members 82, 86 in relation to one another. To this end, the second member 82 rotates with respect to the third member 86 (or the third member 86 rotates with respect to the second member 82) around the fourth axis 146 less than three hundred and sixty degrees (360°), and in some embodiments more specifically approximately two hundred and forty degrees (240°).

With continued reference to the illustrated embodiment, the third member 86 also connects to a fourth member 90. The connection between the third and fourth members 86, 90 is proximate an end of the third member 86 that is opposite the end of the third member 86 having the connection with the second member 82. The connection between the third and fourth members 86, 90 is at a fifth axis 154 (shown in FIG. 5). The third and fourth members 86, 90 are configured to rotate about the fifth axis 154. More specifically, the third member 86 rotates with respect to the fourth member 90 (or the fourth member 90 rotates with respect to the third member 86) around the fifth axis 154 less than three hundred and sixty degrees (360°), and in some embodiments more specifically approximately two hundred and forty degrees (240°).

The third and fourth members 86, 90 also form an adjustable connection, with each member also including a plurality of teeth (or geared teeth) (not shown) that are configured to interlock (or mesh) when positioned into a mating arrangement (e.g., a Hirth joint or coupling, etc.). The geared teeth and the mating arrangement, which is the same as the connection between the first member 78 and the swivel 94, can be maintained by a fastener 158 (e.g., a bolt, etc.). The fastener 158 can be positioned along the fifth axis 154, and is configured to be loosened to disengage the teeth that form the connection between the third and fourth members 86, 90 to allow for rotation of the third member 86 and the fourth member 90 around the fifth axis 154, and tightened to engage the teeth and form (or reform) a fixed connection between the third and fourth members 86, 90 to maintain the position of the members 86, 90 in relation to one another. The fifth axis 154 can be approximately perpendicular to the fourth axis 146. As such, the third member 86 provides a base for an attached member (e.g., the second member 82 in FIG. 3) to pivot (or rotate) in a first direction (or about the X-axis of FIGS. 1-2), and another attached member (e.g., the fourth member 90 in FIG. 3) to pivot (or rotate) in a second direction perpendicular to the first direction (or about the Y-axis of FIGS. 1-2). Stated another way, the attachments 150, 158 (or attachment axes 146, 154) provided by the third member 86 of the illustrated embodiment are orthogonal (or perpendicular) to one another.

Figure 9:
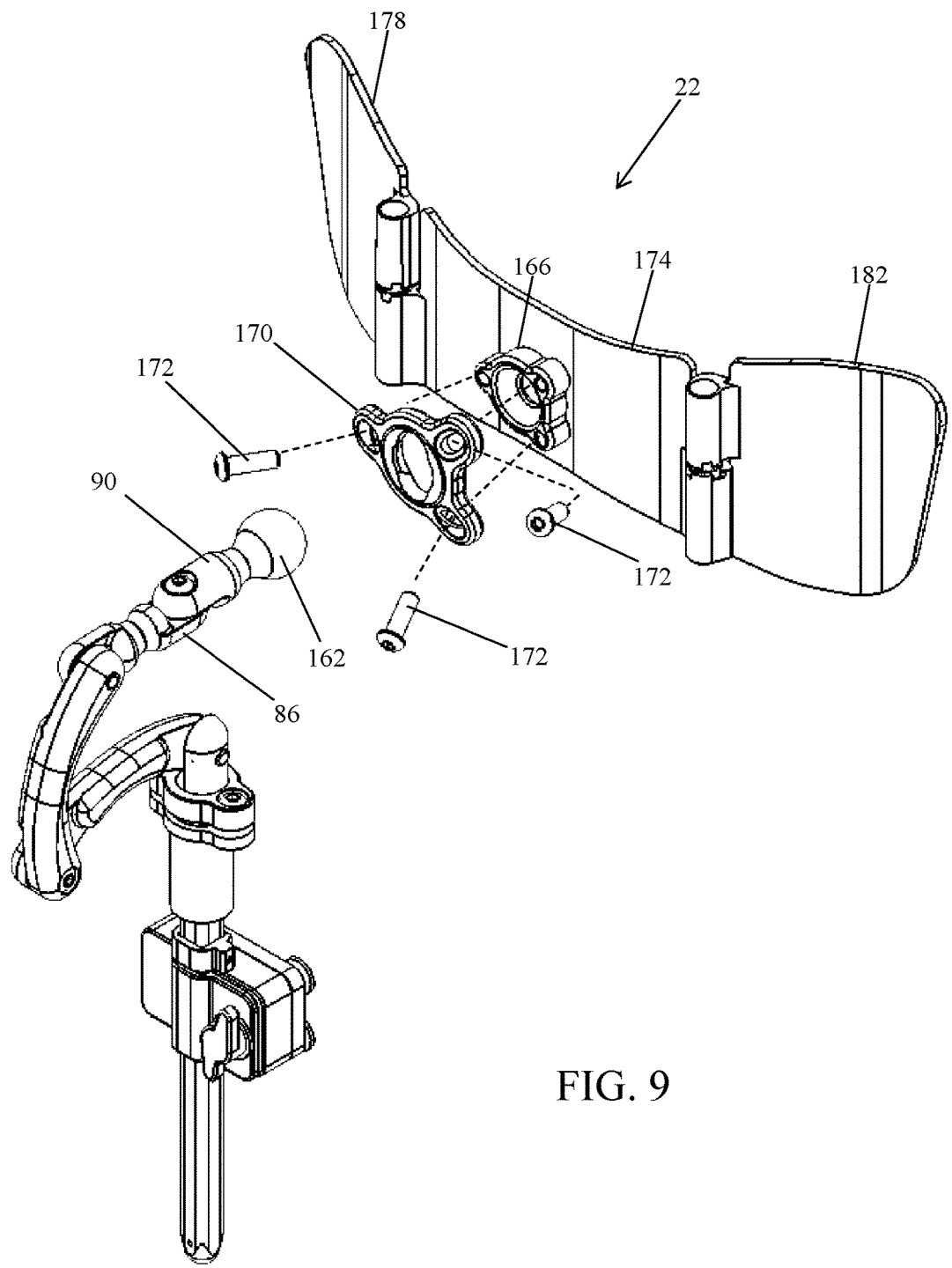
FIG. 9 is another partially exploded view of the adjustable head support of FIG. 1, shown with a connection between the articulating arm and the headrest in an unassembled state.

Referring now to FIGS. 3, 5, and 9, the fourth member 90 pivotally connects to the head support pad 22. As best shown in FIG. 9, the fourth member 90 can include a ball joint defined by a ball 162 at an end of the fourth member 90 opposite the connection to the third member 86. The ball 162 is received by a socket 166 that is mounted to the head support pad 22, although the locations of the ball and socket 162, 166 can be reversed in other embodiments. A flange 170 selectively retains the ball 162 in the socket 166, allowing the ball 162 to pivot within the socket 166. This facilitates adjustability of the head support pad 22, which carries the flange 170, about the ball joint 162, 166. More specifically, in some embodiments the head support pad 22 pivots about the ball joint 162, 166 (or the ball joint 162, 166 pivots about the head support pad 22) at least forty five degrees (45°) from side to side (e.g., pivoting about an axis (not shown) parallel to the fifth axis 154), and at least approximately eighty degrees (80°) up and down (e.g., pivoting about an axis (not shown) perpendicular to the fifth axis 154). The head support pad 22 can also rotate about the ball joint 162, 166 (or the ball joint 162, 166 pivots about the head support pad 22) approximately three hundred and sixty degrees (360°). The flange 170 can be coupled to the socket 166 by a plurality of fasteners 172 (e.g., bolts, etc.). The flange 170 and the socket 166 cooperate to maintain (and retain) engagement of the ball 162 in the socket 166, while also allowing for pivoting adjustment of the ball 162 about the socket 166 (and/or the socket 166 about the ball 162). This allows for repositioning of the head support pad 22 with respect to the articulating arm 18 (and/or repositioning of the articulating arm 18 with respect to the head support pad 22). The fasteners 172 can engage the flange 170 and the socket 166 at an oblique angle to the socket 166 (and to the head support pad 22) as shown, or in any other desired manner.

As shown in FIGS. 6-9, the head support pad 22 includes a central support 174 (otherwise referred to herein as a center plate or primary support plate or central portion 174) and two adjustable side support plates or wings or side portions 178, 182 (or referred to as first and second side support plates or wings or side portions 178, 182) that are respectively connected on opposite ends of the central support 174. The first and second side supports 178, 182 are each configured to pivot (or rotate) with respect to the central support 174 about a respective support pivot axis 186, 190 (shown in FIG. 7). Each of the side supports 178, 182 forms an adjustable connection with the central support 174. At each adjustable connection (positioned along the respective axis 186, 190), the side support 178, 182 and the central support 174 can include a plurality of teeth (or geared teeth) (not shown) that are configured to interlock (or mesh) when positioned into a mating arrangement (e.g., a Hirth joint or coupling, etc.). The geared teeth and the mating arrangement, which can be the same as the connection between the first member 78 and the swivel 94, can be maintained by a respective fastener 194, 198 (e.g., a bolt, etc.). The fastener 194 can be positioned along the first support pivot axis 186, while the fastener 198 can be positioned along the first support pivot axis 190. Each fastener 194, 198 is configured to be loosened to disengage the teeth that form the connection between the side support 178, 182 and the central support 174 to allow for repositioning of the side support 178, 182 about the central support 174 around the respective axis 186, 190, and tightened to engage the teeth and form (or reform) a fixed connection between the side support 178, 182 about the central support 174 to maintain the position of the side support 178, 182 in relation to the central support 174. While not illustrated, the head support pad 22 can include one or more layers of support material (e.g., foam, or other suitable cushioning material) and/or a cover to improve user comfort and/or support. In addition, in other examples of embodiments, the head support pad 22 can include only the center plate 174, or can otherwise not include one or both of the side supports 178, 182 (e.g., for use with individuals having a small head size, etc.).

It should be appreciated that each fastener 104, 118, 134, 150, 158, 172, 194, 198 (e.g., screw, bolt, etc.) can be substantially the same. Generally, to facilitate easy adjustment of the adjustable head support 10, each fastener 104, 118, 134, 150, 158, 172, 194, 198 can be similarly keyed in that it receives the same tool to facilitate adjustment (e.g., the same sized hex key, Allen key, Allen wrench, etc.).

In operation of the illustrated embodiment, the adjustable head support 10 is attached to a chair (not shown). The chair attachment assembly 14 is mounted to the chair by fastener(s) 30 (e.g., screw(s), bolt(s), etc.). Once the chair attachment assembly 14 is mounted (or otherwise connected) to the chair, the adjustable head support 10 can be adjusted in three dimensions, about the X-axis, the Y-axis, and the Z-axis (shown in FIGS. 1-2), to position the head support pad 22 in any desired location and orientation (in relation to the chair) in order to provide head support for a person sitting in the chair.

To adjust a height of the articulating arm 18 and the head support pad 22 in relation to the chair attachment assembly 14, the tension adjustment member 50 can be loosened to allow the height adjustment member 44 to slide within the slot 42 of the chair attachment bracket 26. The height adjustment member 44 slides along the Y-axis (see FIGS. 1-2) (or along the first axis 106). Once the desired height is achieved, the tension adjustment member 50 is tightened to apply tension (or compress) the compression arm 46 against the height adjustment member 44, holding the height adjustment member 44 in place relative to the chair attachment assembly 14. The height adjustment collar 54 can then be adjusted and set into a position to limit unintended downward movement (along the Y-axis or first axis 106) of the height adjustment member 44 in relation to the chair attachment assembly 14. The height adjustment collar 54 can be further locked into position by engaging the set screw 70 through the set screw aperture 74 and into engagement with a portion (or surface) of the height adjustment member 44.

The position of the articulating arm 18 and the head support pad 22 can also be adjusted about the X-axis, the Y-axis, and the Z-axis by rotation about the first axis 106, pivoting (or rotating) about the second, third, fourth, and fifth axes 110, 130, 146, 154, and pivoting of the head support pad 22 about the ball joint 162, 166. More specifically, the fastener(s) 104 (e.g., screw(s), bolt(s), etc.) can be loosened, loosening the connection between the flange 102 and the socket 98, allowing for rotation of the swivel joint 94 about the first axis 106. This in turn allows the articulating arm 18 and the head support pad 22 to rotate about the first axis 106. Once the desired position is achieved, the fastener(s) 104 can be tightened, engaging (or reengaging) the fixed connection between the flange 102 and the socket 98 to restrict further rotation of the swivel joint 94.

Additionally or alternatively, one or more of the first, second, third, and/or fourth members 78, 82, 86, 90 can pivot (or rotate) about the respective second, third, fourth and/or fifth axes 110, 130, 146, 154 to move the head support pad 22 into a desired position along the X-axis, the Y-axis, and/or the Z-axis (depending on the orientation of the swivel joint 94). To pivot (or rotate) about the respective axes 110, 130, 146, 154 the respective fastener 118, 134, 150, 158 (e.g., screw, bolt, etc.) is loosened, loosening the corresponding connection between the respective members 78, 82, 86, 90. Once the desired position is achieved, the respective fastener 118, 134, 150, 158 is tightened, engaging (or reengaging) the fixed corresponding connection between the respective members 78, 82, 86, 90.

Further, additionally or alternatively, the head support pad 22 can pivot about the fourth member 90 to a desired orientation. To position the head support pad 22, one or more of the fasteners 172 (e.g., screws, bolts, etc.) can be loosened to loosen the connection between the flange 170 and the socket 166. This frees the head support pad 22 to pivot about the ball joint 162 on the fourth member 90. Once the head support pad 22 is positioned into a desired orientation, the one or more of the fasteners 172 can be tightened to engage (or reengage) the flange 170 and the socket 166 to restrict further repositioning of the head support pad 22 in relation to the fourth member 90. The oblique angle of the fasteners 172 to the socket 166 (and to the head support pad 22) advantageously provides access to each fastener 172 independent of the fourth member 90 orientation (or position) in relation to the head support pad 22, improving ease of head support pad 22 and/or fourth member 90 adjustment.

Once the articulating arm 18 and the head support pad 22 are in the desired orientation or position, the headrest side supports 178, 182 can be adjusted to desired positions in relation to the central support 174. One or both fastener(s) 194, 198 can be loosened to disengage the connection between the associated side support 178, 182 and the central support 174. The associated side support 178, 182 can then pivot (or rotate) about the central support 174 around the respective axis 186, 190 to a desired orientation. Once the desired orientation is achieved, the appropriate fastener(s) 194, 198 can be tightened to engage (or reengage) the fixed connection between the side support 178, 182 and the central support 174 to maintain the desired orientation of the side support 178, 182 in relation to the central support 174.

One or more aspects of the adjustable head support 10 for a chair provides certain advantages. For example, the head support 10 provides for adjustment of the articulating arm 18 and the head support pad 22 in three dimensions (along an X-axis, Y-axis, and/or Z-axis) to provide head support to different individuals using the chair, while taking into account factors that include different body types, impairments (e.g., paraplegia, quadriplegia, etc.), diseases, and/or disorders. These and other advantages are realized by the disclosure and claims provided herein.

What is claimed is:

1. An adjustable head support comprising:
   an articulating arm including a plurality of consecutively connected members, the plurality of members include:
      a first arcuate member,
      a second arcuate member,
      a third member, and
      a fourth member,
      the third member having opposing first and second ends, one of the plurality of members coupled to the first end and configured to rotate about a first axis, and another of the plurality of members coupled to the second end and configured to rotate about a second axis, the first axis and the second axis being perpendicular; and
   a head support assembly pivotally coupled to the articulating arm.

2. The adjustable head support of claim 1, further comprising a chair attachment assembly that is coupled to the articulating arm, the chair attachment assembly configured to couple the articulating arm to a chair.

3. The adjustable head support of claim 2, wherein the chair is a wheelchair.

4. The adjustable head support of claim 2, wherein the articulating arm includes an elongated height adjustment member that is received by the chair attachment assembly.

5. The adjustable head support of claim 4, wherein the chair attachment assembly includes a chair attachment bracket that defines a slot, the elongated height adjustment member is slidably received by the slot.

6. The adjustable head support of claim 5, wherein the elongated height adjustment member slidably receives a height adjustment collar, the height adjustment collar is configured to limit movement of the elongated height adjustment member into the slot.

7. The adjustable head support of claim 6, wherein the elongated height adjustment member includes a channel, and the height adjustment collar includes a projection, the projection is keyed to be received by the channel.

8. The adjustable head support of claim 6, wherein the height adjustment collar is configured to selectively slide along the elongated height adjustment member.

9. The adjustable head support of claim 4, wherein the articulating arm is rotatably coupled to the elongated height adjustment member by a swivel joint.

10. The adjustable head support of claim 9, wherein the swivel joint is configured to rotate about a third axis that is parallel to the second axis.

11. The adjustable head support of claim 10, wherein the third axis is defined by the elongated height adjustment member.

12. The adjustable head support of claim 10, wherein the swivel joint is configured to rotate about the third axis up to three-hundred and sixty degrees.

13. The adjustable head support of claim 10, wherein the articulating arm is rotatably coupled to the swivel joint, the articulating arm configured to rotate with respect to the swivel joint about a fourth axis that is perpendicular to the third axis.

14. The adjustable head support of claim 1, the head support assembly further comprising:
a primary support plate;
a first side support pivotally connected to the primary support plate;
a second side support pivotally connected to the primary support plate, wherein the first and second side supports are respectively connected to opposing ends of the primary support plate.

15. The adjustable head support of claim 14, wherein the articulating arm is pivotally coupled to the primary support plate.

16. The adjustable head support of claim 14, wherein the articulating arm includes a ball joint that is received by a socket coupled to the primary support plate to pivotally couple the articulating arm to the head support assembly.

17. An adjustable head support comprising:
an articulating arm that includes:
a swivel joint rotatably coupled to a height adjustment member, the swivel joint configured to rotate about a first axis defined by the height adjustment member;
a plurality of consecutively coupled members, the members include:
a first member that is rotatably coupled to the swivel joint and configured to rotate about a second axis perpendicular to the first axis; and
a second member;
a third member; and
a fourth member, wherein the third member is coupled at one end to one of the plurality of members and configured to rotate about a third axis, and is coupled at the opposite end to another of the plurality of members and configured to rotate about a fourth axis, the third axis being perpendicular to the fourth axis; and
a head support assembly pivotally coupled to the articulating arm.

18. The adjustable head support of claim 17, wherein the third axis is parallel to the second axis.

19. The adjustable head support of claim 17, further comprising a chair attachment bracket that is configured to engage a chair, the chair attachment bracket defining a slot that slidably receives the height adjustment member.

20. The adjustable head support of claim 17, wherein the first member has an arcuate shape.

21. The adjustable head support of claim 1, wherein the first arcuate member defines an inner surface facing a first direction, and the second arcuate member defines an inner surface facing a second direction, the first direction being opposite the second direction.

22. The adjustable head support of claim 1, wherein the first arcuate member is concave and the second arcuate member is convex.

23. The adjustable head support of claim 1, wherein the first arcuate member is rotatably coupled to the second arcuate member.

24. An adjustable head support comprising:
an articulating arm including:
a swivel joint rotatably coupled to a height adjustment member, the swivel joint configured to rotate about a first axis defined by the height adjustment member;
a first arcuate member rotatably coupled to the swivel joint and configured to rotate about a second axis perpendicular to the first axis;
a second arcuate member rotatably coupled to the first arcuate member and configured to rotate about a third axis parallel to the second axis;
a third member coupled at to the second arcuate member and configured to rotate about a fourth axis parallel to the third axis; and
a fourth member coupled to the third member and configured to rotate about a fifth axis perpendicular to the fourth axis, the fourth member including a ball; and
a head support assembly including a ball socket configured to receive the ball, pivotally coupling the head support assembly to the articulating arm.

* * * * *